3,457,281
2-(ALKOXYALKYLAMINOMETHYL)-BENZOFURANS

Peter N. Green and Maurice Shapero, Greater London, England, assignors to Ward Blenkinsop & Company Limited, Greater London, England, a British company
No Drawing. Filed Dec. 5, 1966, Ser. No. 598,978
Claims priority, application Great Britain, Dec. 8, 1965, 52,161/65; Aug. 23, 1966, 37,818/66
Int. Cl. C07d 5/34
U.S. Cl. 260—346.2          9 Claims

ABSTRACT OF THE DISCLOSURE

N-substituted 2-amino - 2,3 - dihydrobenzofuran having the general formula

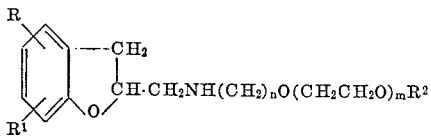

in which each of R and $R^1$ is a hydrogen or halogen atom or an alkyl or alkoxy group having one to six carbon atoms, $n$ is one, two or three, $m$ is zero, one or two, and $R^2$ is an alkyl group having one to six carbon atoms. Acid addition salts of the 2,3-dihydrobenzofurans are also provided herein. The aforementioned compounds have muscle relaxant properties and are free from all side effects.

---

This invention relates to the production of pharmacologically valuable 2,3-dihydrobenzofurans.

The present invention provides an N-substituted 2-amino-2,3-dihydrobenzofuran having the general formula

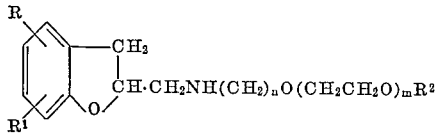

in which each of R and $R^1$ is hydrogen or halogen atom or an alkyl or alkoxy group having one to six carbon atoms, $n$ is one, two or three, $m$ is zero, one or two and $R^2$ is an alkyl group having one to six carbon atoms. When R, $R^1$ and $R^2$ are alkyl groups it is preferred that they are methyl or ethyl groups.

The substituents R and $R^1$ may be present in any of the four available positions in the benzene ring of the 2,3-dihydrobenzofuran and may be like or unlike in nature.

The invention also includes the acid addition salts, such as the hydrochloride, sulphate, phosphate, acid tartrate and acid maleate of the said 2,3-dihydrobenzofurans.

According to a feature of this invention the hydrohalides of the substituted 2,3-dihydrobenzofurans having the above general formula may be prepared by reacting a 2-monosubstituted-methyl 2,3-dihydrobenzofuran having the general formula

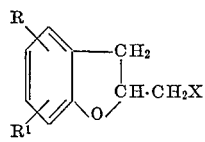

with an aliphatic oxygen-containing compound having the general formula $$Z(CH_2)_nO.(CH_2CH_2O)_mR^2$$

in which R, $R^1$, $R^2$, $n$ and $m$ are as above defined, one of X and Z is a halogen atom and the other is a primary amino group.

Thus the reaction may be between a 2-aminomethyl-2,3-dihydrobenzofuran having the substituents R and $R^1$ and a halogen-substituted aliphatic oxygen-containing compound having the above general formula in which Z is a halogen atom. Alternatively, the reaction may be between a 2-halomethyl-2,3-dihydrobenzofuran having the substituents R and $R^1$ and a primary amino-substituted aliphatic oxygen-containing compound having the above general formula in which Z is a primary amino group. Both of these reactions lead to the formation of a hydrohalide of a 2-substituted 2,3-dihydrobenzofuran when the reactants are used in substantially equimolar proportions. This hydrohalide may be subsequently decomposed by treating the crude product with an acid acceptor. It is preferred to use an inorganic acid acceptor and to carry out the decomposition in the presence of a solvent for the base being liberated. The bases can subsequently be purified by distillation. On neutralisation with an acid the corresponding salt of the base is obtained.

The 2-aminomethyl-2,3-dihydrobenzofurans having the substituents R and $R^1$ may be produced by reaction of the corresponding 2-halomethyl-2,3-dihydrobenzofuran such as the bromomethyl compound, with an alkali metal phthalimide in the presence of a lower dialkylformamide such as dimethylformamide to form the corresponding 2-phthalimidomethyl-2,3-dihydrobenzofuran and the latter is then reacted with hydrazine to form the corresponding 2-aminomethyl compound (Manske-Inge reaction). Thus there may be used 2-aminomethyl-2,3-dihydrobenzofuran, 2-aminomethyl-2,3-dihydro-5-methylbenzofuran, 2-aminomethyl-2,3-dihydro-6-methylbenzofuran, 2-aminomethyl-2,3-dihydro-5-methoxybenzofuran, 2-aminomethyl-2,3-dihydro-5-chlorobenzofuran, 2-aminomethyl-2,3-dihydro-7-methylbenzofuran, 2-aminomethyl - 2,3 - dihydro-5-bromobenzofuran, 2-aminomethyl-2,3-dihydro-7-fluorobenzofuran, or 2-aminomethyl-2,3-dihydro-4,6-dimethylbenzofuran. Alternatively, the 2-aminomethyl-2,3-dihydrobenzofurans may be produced by the hydrogenative scission of the corresponding 2-benzylaminomethyl-2,3-dihydrobenzofurans having the substituents R and $R^1$ in the presence of a catalyst such as Raney nickel or palladium.

The halogen-substituted aliphatic oxygen-containing compounds used in the process of the invention employing the 2-aminomethyl-2,3-dihydrobenzofurans have the general formula $$Hal.(CH_2)_nO(CH_2CH_2O)_mR^2$$

in which Hal is a halogen atom, preferably chlorine or bromine, and $m$, $n$ and $R^2$ are as defined above. These compounds are ethers containing at least one but not more than three oxygen atoms. When there are two or three oxygen atoms these are preferably separated by ethylene groups. The group $R^2$ is preferably a methyl or ethyl group.

Examples of halogen-substituted aliphatic ethers which may be used include chloromethyl β-ethoxyethyl ether, β-bromoethyl β-ethoxyethylether, β-chloroethyl β'-methoxyethyl ether, β-chloroethyl β-(β'-ethoxyethoxy)ethyl ether, chloromethyl, β-(β'-isopropoxyethoxy)ethyl ether, chloromethyl β-(β'-n-butoxyethoxy)ethyl ether, chloromethyl β-n-propoxyethyl ether and γ-chloro-n-propyl-β-methoxyethyl ether.

The 2-halomethyl-2,3-dihydrobenzofurans having the substituents R and $R^1$ are readily obtainable from the corresponding acylated ortho-allylphenols containing the nuclear substituents R and $R^1$ by the addition of one molecule of chlorine or bromine thereto to form the corresponding acylated ortho-dichloro- or dibromo-propyl phenols which are then deacylated and ring closure effected by heating with potassium hydroxide. Examples of 2-halomethyl-2,3-dihydrobenzofurans which may be used include 2-bromomethyl-2,3-dihydrobenzofuran, 2-chloromethyl - 2,3 - dihydrobenzofuran, 2-bromomethyl-2,3-dihydro - 5 - methyl-benzofuran, 2-bromomethyl-2,3-dihydro-6-methylbenzofuran, 2-chloromethyl-2,3-dihydro-7-methylbenzofuran, 2-bromomethyl-2,3-dihydro-5-methoxybenzofuran, 2-bromomethyl - 2,3 - dihydro-5-ethoxybenzofuran, 2-bromomethyl-2,3-dihydro-5-chlorobenzofuran, 2-bromomethyl-2,3-dihydro - 5 - bromobenzofuran and 2-bromomethyl-2,3-dihydro-4,6-dimethylbenzofuran.

The amino-substituted aliphatic oxygen-containing compounds which may be used in the process of the invention with the 2-halomethyl-2,3-dihydrobenzofurans have the general formula

$$NH_2(CH_2)_nO(CH_2CH_2O)_mR^2$$

in which $m$ $n$ and $R^2$ are as above defined. These compounds are amino-ethers containing one to three ethereal oxygen atoms. Examples of such compounds include β-aminoethyl β'-methoxyethyl ether, γ-amino-n-propyl β-methoxyethyl ether, β-aminoethyl β'-(β''-ethoxyethoxy) ethyl ether and β-ethoxyethyl aminomethyl ether.

The compounds of the present invention are, as indicated above, readily obtained as the hydrohalides when the selected reactants are heated together in equimolar proportions. No solvent is necessary but one may be used if desired. The reactants are heated at a temperature at which at least one is liquid. Suitable solvents include cyclic ethers such as dioxane and ether alcohols such as 2-ethoxyethanol. It is however preferred to employ an excess of the reactant containing the primary amino group. When two moles of the reactant containing the primary amino group are employed the second mole acts as an acid acceptor and the hydrohalide thereof is a component of the reaction mixture which may be decomposed and worked up as indicated above.

The compounds of the present invention have muscle relaxant properties and appear to be free from side effects. Muscular relaxation has been observed in rats and mice when doses of 15 mgm. to 75 mgm. per kilogram bodyweight are administered orally or subcutaneously. The present compounds have been shown to possess a reduced toxicity and a high therapeutic index when compared with a control compound which possesses muscle relaxant properties: typical results obtained when the compounds are subcutaneously injected into mice are shown in the appended Table I. The mice were submitted to testing in groups of six.

TABLE I

| Compound | ED$_{50}$, mg./kg. | LD$_{50}$, mg./kg. | Therapeutic index |
| --- | --- | --- | --- |
| Example 1 | 50–75 | 300–350 | 6 |
| Example 2 | 44.5 | 600–650 | 13.5 |
| Example 3 | 18.5 | 400 | 21.5 |
| Example 7 | 35 | 200–300 | 7 |
| Control compound | 300 | 1100 | 3.7 |

The control compound used was 3-(ortho-methoxyphenoxy)-2-hydroxypropyl-1-carbamate. The ED$_{50}$ and LD$_{50}$ values were determined by a graphical method.

The duration of the muscle relaxant effect was also determined in mice and compared with the same control compound. All compounds were tested on groups of six mice.

TABLE II

| Compound | Dose (mg./kg.) | Duration in minutes |
| --- | --- | --- |
| Example 1 | 125 | 120 |
| Example 2 | 100 | 97.5 |
| Example 3 | 25 | 30 |
| Example 7 | 100 | 167.5 |
| Control compound | 500 | 75 |

Whilst the compounds are somewhat more toxic than the control compound as shown by the higher LD$_{50}$ value of the latter, the new compounds are effective in much smaller doses and consequently have a markedly higher therapeutic index. When used in doses which in no case are greater than 25% of that of the control compound, a muscle relaxant effect which is usually of much greater duration is achieved, as shown by the results given in Table II and which, in all cases, is high in relation to the dosage given when compared with the control.

Similar effects have been observed in rabbits when administered intravenously in amounts of 5 mgm. to 10 mgm. per kilogram bodyweight. When administered subcutaneously to mice in doses of 50 mgm. to 100 mgm. per kilogram bodyweight the compounds have been found to potentiate the action of morphine and hexabarbitone.

The following examples illustrate the nature of the invention.

EXAMPLE 1

2-(3'-methoxypropyl)aminomethyl-2,3-dihydrobenzfuran 2-bromomethyl-2,3-dihydrobenzofuran (31.9 g.) and 3-methoxypropylamine (40 g.) were heated under reflux until the temperature of the refluxing mixture became constant. The mixture was cooled and added to a solution of potassium carbonate (21 g.) in water (60 mls.). The organic phase was then extracted with chloroform (one 50 mls. portion and then two 20 mls. portions). The extracts were combined and dried over anhydrous sodium sulphate. After removal of solvent, distillation of the residue gave the product (20.2 g.) as a colourless oil boiling at 144–148° C./2 mm.

The hydrochloride, prepared by treating a solution of the base in isopropanol with anhydrous hydrogen chloride, is obtained as white crystals having a melting point of 178–179° C.

*Analysis.*—Calculated for $C_{13}H_{20}NO_2Cl$, percent C, 60.54; H, 7.82; Cl, 13.76. Found, percent: C, 60.34; H, 7.97; Cl, 13.65.

EXAMPLE 2

2[(2''-methoxy-2'-ethoxy)ethyl]-aminomethyl-2,3-dihydrobenzofuran

2 - aminomethyl - 2,3 - dihydrobenzofuran (27 g.) and [2-methoxy-(2-ethoxy-ethyl)] chloride (12.5 g.) were heated at 160° C. for 1 hour and the product then worked up as described in Example 1. The product (12.6 g.) was obtained as a colourless oil boiling at 184–190° C./3 mm.

The hydrochloride, prepared by treating a solution of the base in isopropanol with anhydrous hydrogen chloride, is obtained as white crystals and has a melting point of 135–137° C.

EXAMPLE 3

2-[(2'''-ethoxy-2''-ethoxy-2'-ethoxy)ethyl]-aminomethyl-2,3-dihydrobenzofuran 2-aminomethyl-2,3-dihydrobenzofuran (29.8 g.) and 2''-ethoxy-2'-ethoxy-2-ethoxyethyl chloride (19.6 g.) were heated at 160° C. for 1 hour and the product then worked up as described in Example 1. The product (14.2 g.) was obtained as a pale yellow oil boiling at 195–199° C./1 mm.

The hydrochloride of this compound was obtained as a viscous oil.

EXAMPLE 4

2-(3'-methoxypropyl)aminomethyl-2,3-dihydro-5-methylbenzofuran 2-bromomethyl-2,3-dihydro-5-methylbenzofuran (22.7 g.) and 3-methoxy-propylamine (26.7 g.) were heated under reflux until the temperature of the refluxing mixture became constant and then for a further 30 minutes. The product was isolated as described in Example 1. It was a pale yellow oil (13.8 g.), boiling point 142–144° C./0.6 mm.

EXAMPLE 5

2-(3'-methoxypropyl)aminomethyl-2,3-dihydro-5-methoxybenzofuran 2-bromomethyl-2,3-dihydro-5-methoxybenzofuran (24.3 g.) and 3-methoxy-propylamine (26.7 g.) were heated under reflux until the temperature of the refluxing mixture became constant and then for a further 30 minutes. The mixture was worked up as described in Example 1. The product was obtained as a pale yellow oil (14.2 g.), boiling point 162–168° C./0.6 mm.

The hydrochloride was prepared as described in Example 4 and separated as white crystals, melting point 177–179° C.

EXAMPLE 6

2-(3'-methoxypropyl)-aminomethyl-2,3-dihydro-5-chloro-benzofuran

2 - bromomethyl-2,3-dihydro-5-chlorobenzofuran (24.7 g.) and 3-methoxy-propylamine (26.7 g.) were heated under reflux until the temperature of the refluxing mixture became constant and then for a further 30 minutes. The mixture was worked up as described in Example 1. The product was obtained as a pale yellow oil (16.2 g.), boiling point 154–158° C./0.77 mm.

The hydrochloride was prepared as described in Example 4 and separated as white crystals, melting point 190–192° C.

EXAMPLE 7

2-[2'-(2''-methoxyethoxy)ethyl]-aminomethyl-2,3-dihydro-7-fluorobenzofuran

2 - aminomethyl - 2,3-dihydro-7-flurobenzofuran (13.4 g.) and [2-(2'-methoxyethoxy)ethyl] chloride (5.44 g.) were heated at 160° C. for 2 hours. On working up the product, as described in Example 1, there was obtained 5 g. of a pale yellow oil, boiling point 168–176° C./0.8 mm.

The hydrochloride prepared as described in Example 4 separated from a 66.6%/33.3% iso-propylether/iso-propyl alcohol mixture as white crystals, melting point 125–127° C.

*Analysis.*—Calculated for $C_{14}H_{21}O_3NFCl$, percent: C, 54.98; H, 6.92; Cl, 11.6. Found, percent: C, 55.21; H, 6.94; Cl, 11.71.

EXAMPLE 8

2-(3'-methoxypropyl)aminomethyl-2,3-dihydro-7-methylbenzofuran 2-bromomethyl-2,3-dihydro-7-methylbenzofuran (22.7 g.) and 3-methoxypropylamine (26.7 g.) were heated under reflux for 30 minutes and then worked up as described in Example 1. The product was obtained as a pale yellow oil (13.6 g.), boiling point 136–142° C/0.75 mm.

The hydrochloride was prepared as described in Example 4 and was obtained as white crystals having a melting point of 143–145° C.

We claim:
1. A member selected from the group consisting of a basically substituted 2-methyl-2,3-dihydrobenzofuran having the formula

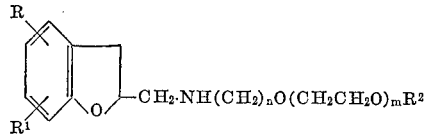

in which formula each of R and $R^1$ is independently selected from hydrogen, fluorine, chlorine and bromine atoms and alkyl and alkoxy groups having less than 7 carbon atoms, $n$ is an integer which is at least one, but less than three, $m$ is zero, one or two, and $R^2$ is an alkyl group having less than seven carbon atoms, and addition salts thereof with acids.

2. A member selected from the group consisting of a basically substituted 2-methyl-2,3-dihydrobenzofuran as claimed in claim 1, in which each of R and $R^1$ is a hydrogen atom, $n$ is 3, $m$ is 0 and $R^2$ is methyl, and the hydrochloride thereof.

3. A member selected from the group consisting of a basically substituted 2-methyl-2,3-dihydrobenzofuran as claimed in claim 1, in which each of R and $R^1$ is a hydrogen atom, $n$ is 2, $m$ is 1 and $R^2$ is methyl, and the hydrochloride thereof.

4. A member selected from the group consisting of a basically substituted 2-methyl-2,3-dihydrobenzofuran as claimed in claim 1, in which each of R and $R^1$ is a hydrogen atom, $n$ is 2, $m$ is 2 and $R^2$ is ethyl, and the hydrochloride thereof.

5. A member selected from the group consisting of a basically substituted 2-methyl-2,3-dihydrobenzofuran as claimed in claim 1, in which R is hydrogen, $R^1$ is a methyl group in the 5-position, $n$ is 3, $m$ is 0 and $R^2$ is methyl, and the hydrochloride thereof.

6. A member selected from the group consisting of a basically substituted 2-methyl-2,3-dihydrobenzofuran as claimed in claim 1, in which R is hydrogen, $R^1$ is a methoxy group in the 5-position, $n$ is 3, $m$ is 0 and $R^2$ is methyl, and the hydrochloride thereof.

7. A member selected from the group consisting of a basically substituted 2-methyl-2,3-dihydrobenzofuran as claimed in claim 1, in which R is hydrogen, $R^1$ is a chlorine atom in the 5-position, $n$ is 3, $m$ is 0 and $R^2$ is methyl, and the hydrochloride thereof.

8. A member selected from the group consisting of a basically substituted 2-methyl-2,3-dihydrobenzofuran as claimed in claim 1, in which R is a hydrogen atom, $R^1$ is a fluorine atom present in the 7-position, $n$ is 2, $m$ is 1 and $R^2$ is methyl, and the hydrochloride thereof.

9. A member selected from the group consisting of a basically substituted 2-methyl-2,3-dihydrobenzofuran as claimed in claim 1, in which R is hydrogen, $R^1$ is a methyl group in the 7-position, $n$ is 3, $m$ is 0 and $R^2$ is methyl, and the hydrochloride thereof.

References Cited

UNITED STATES PATENTS 3,200,132  8/1965  Weiner _____ 260—346.2

ALEX MAZEL, Primary Examiner

BERNARD I. DENTZ, Assistant Examiner

U.S. Cl. X.R.

424—285